Patented Feb. 19, 1924.

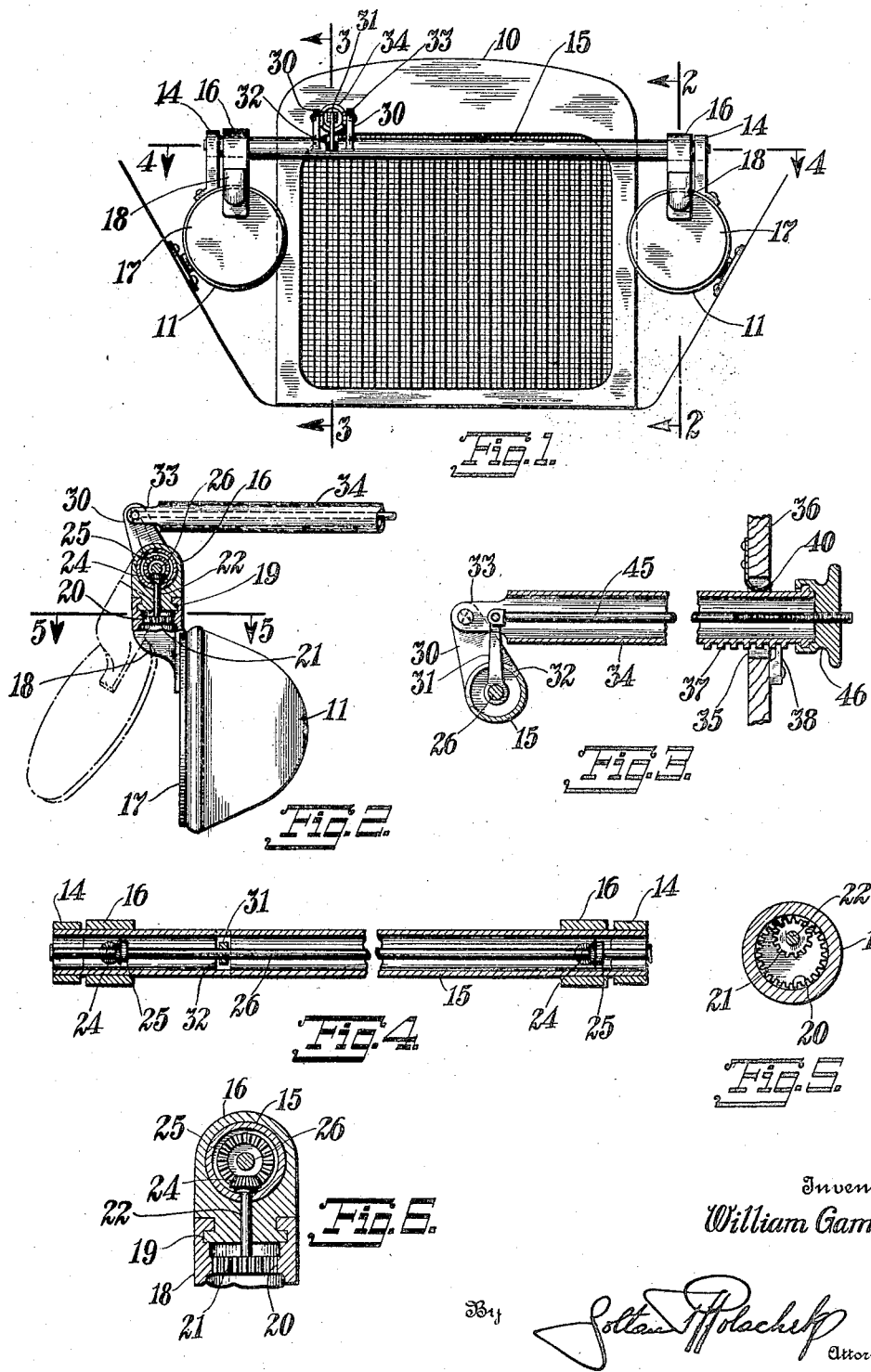

1,484,486

UNITED STATES PATENT OFFICE.

WILLIAM GAMES, OF PROVIDENCE, RHODE ISLAND.

AUTOMOBILE HEADLIGHT SHIELD.

Application filed November 16, 1922. Serial No. 601,252.

*To all whom it may concern:*

Be it known that I, WILLIAM GAMES, a citizen of the Republic of Mexico, residing at Providence, in the county of Providence and State of Rhode Island, have invented certain new and useful Improvements in Automobile Headlight Shields, of which the following is a specification.

This invention relates to automobile headlight shields, having particular reference to adjustable shields which can be positioned to direct the beams of light from the headlights downward upon the roadbed or in a horizontal direction.

The invention has for an object to provide a novel type of headlight shield capable of directing the beams of light downward in front of the automobile, or laterally thereof, as may be desired.

For further comprehension of the invention, and of the objects and advantages thereof, reference will be had to the following description and accompanying drawings, and to the appended claims in which the various novel features of the invention are more particularly set forth.

Fig. 1 of the drawings is a fragmentary front view of an automobile having my improved shields applied to its headlights.

Fig. 2 is a detail longitudinal section taken on the line 2—2 of Fig. 1, showing one of the headlights in side elevation but omitting the other part of the automobile.

Fig. 3 is a detail longitudinal section taken on the line 3—3 of Fig. 1.

Fig. 4 is a detail horizontal section taken on the line 4—4 of Fig. 1.

Fig. 5 is a detail horizontal section taken on the line 5—5 of Fig. 2.

In the drawings the reference numeral 10 indicates the engine hood of an automobile and 11 the usual headlights mounted forwardly thereof and supported in the usual manner. Secured to the tops of the headlights 11 are lugs 14 which pivotally support a hollow shaft 15 extending transversely of the automobile in front of the engine hood. Upon this shaft, adjacent the respective ends thereof, a pair of hubs 16 are fixed on which are mounted circular shields 17 adapted to be projected as desired across the faces of the headlights.

As here shown the shields 17 are fixed on short arms 18 which project from and are rotatively supported by the hubs 16 as indicated at 19 these arms each having an internal gear 20 fixed therein and adapted to be engaged by a spur pinion 21 on the outer end of a short shaft 22 extending through and journaled in the lower sides of the hubs 16 into the hollow inner ends of the arms 18. Each of these shafts 22 has a bevel pinion 24 on its inner end meshing with a like pinion 25 on a shaft 26 extending freely through the hollow shaft 15.

Means are provided whereby the hollow shaft 15 and its enclosed shaft 26 may be rotated either in unison, causing a simple up or down movement to the shields 17, or the shaft 26 may be individually rotated to rotate said shields on the hubs 16 and so direct the light-beams to one side or the other.

As here shown, a pair of ears 30 project upwardly from the shaft 15 near one of the headlights, while between said ears an arm 31 projects rigidly from the shaft 26 through an arcuate slot 32 formed in said shaft 15. Pivotally attached to the upper ends of these ears 30 are lugs 33 formed on the forward end of an oval tube 34 which extends rearwardly to and through a vertical slot 35 in the dash-board 36 of the automobile. Formed on the bottom face of tube 34, adjacent its rear end, are rack-like teeth 37 adapted to be individually engaged by a single tooth 39 fixed to the dash-board 36, a flat spring 40, which is fixed to the dash-board above the tube 34 pressing the latter downward so as to normally hold the locking teeth 37, 38 in engagement and so lock the tube 34 against longitudinal movement.

Connected at its front end to the arm and extending rearwardly through the tube 34 is a rod 45 having its rear end screw-threaded and passing through a cap 46 swiveled on the rear end of the tube 34.

By lifting the rear end of tube 34 until the teeth 37 thereon are clear of the tooth 38 on the dash-board 36 and then moving said rod longitudinally, the shields 17 may be adjusted around shaft 15 to any desired angle, while by rotating the cap 46 the shaft 26 is rocked, causing the shields to rotate as indicated in dotted lines in Fig. 2 so as to direct the beams of light to one side or the other.

While I have illustrated and disclosed a preferred embodiment of my invention it is to be understood that various changes and modifications might be made therein without departing from the spirit and scope of the invention as defined in the appended claims.

Having thus described my invention what I claim as new and desire to protect by Letters Patent of the United States is as follows:

1. In an automobile, a headlight, a hollow shaft extending transversely of the automobile above said headlight, a hub fixed on said shaft, a hollow arm carried by said hub to be rotatable on an axis radial to said shaft, a shield fixed to said arm, an internal gear rigid with said arm, a pinion meshing with said gear, a short shaft in said hub radial to said hollow shaft and having said pinion on its outer end, a shaft extending through the hollow shaft, meshing bevel gears on said second and third shafts, and means for rocking said first and third shafts in unison on said third shaft independently of said first shaft.

2. In an automobile, a headlight, a hollow shaft extending transversely of the automobile above said headlight, a hub fixed on said shaft, a hollow arm carried by said hub to be rotatable on an axis radial to said shaft, a shield fixed to said arm, an internal gear rigid with said arm, a pinion meshing with said gear, a short shaft in said hub radial to said hollow shaft and having said pinion on its outer end, a shaft extending through the hollow shaft, meshing bevel gears on said second and third shafts, and means for rocking said first and third shafts in unison on said third shaft independently of said first shaft, comprising an ear projecting from said first shaft, an arm projecting from said third shaft, a tube connected at its forward end to said ear, a rod connected at its forward end to said last arm and extending through said tube, and a cap swiveled on said tube and having said rod threaded therethrough.

In testimony whereof I have affixed my signature.

WILLIAM GAMES.